Jan. 25, 1955 I. H. C. GREEN Re. 23,929

METHOD OF KNITTING

Original Filed Feb. 27, 1951 3 Sheets-Sheet 1

INVENTOR:
ISAAC H. C. GREEN.
By
ATT'Y.

METHOD OF KNITTING

Original Filed Feb. 27, 1951 3 Sheets-Sheet 2

INVENTOR:
ISAAC H. C. GREEN,
BY
ATT'Y.

INVENTOR:-
ISAAC H.C. GREEN
BY
ATT'Y.

United States Patent Office

Re. 23,929
Reissued Jan. 25, 1955

23,929

METHOD OF KNITTING

Isaac H. C. Green, Pawtucket, R. I., assignor to Hemphill Company, Pawtucket, R. I., a corporation of Massachusetts Original No. 2,626,516, dated January 27, 1953, Serial No. 212,990, February 27, 1951. Application for reissue August 12, 1954, Serial No. 449,536

7 Claims. (Cl. 66—179)

Figure 1:
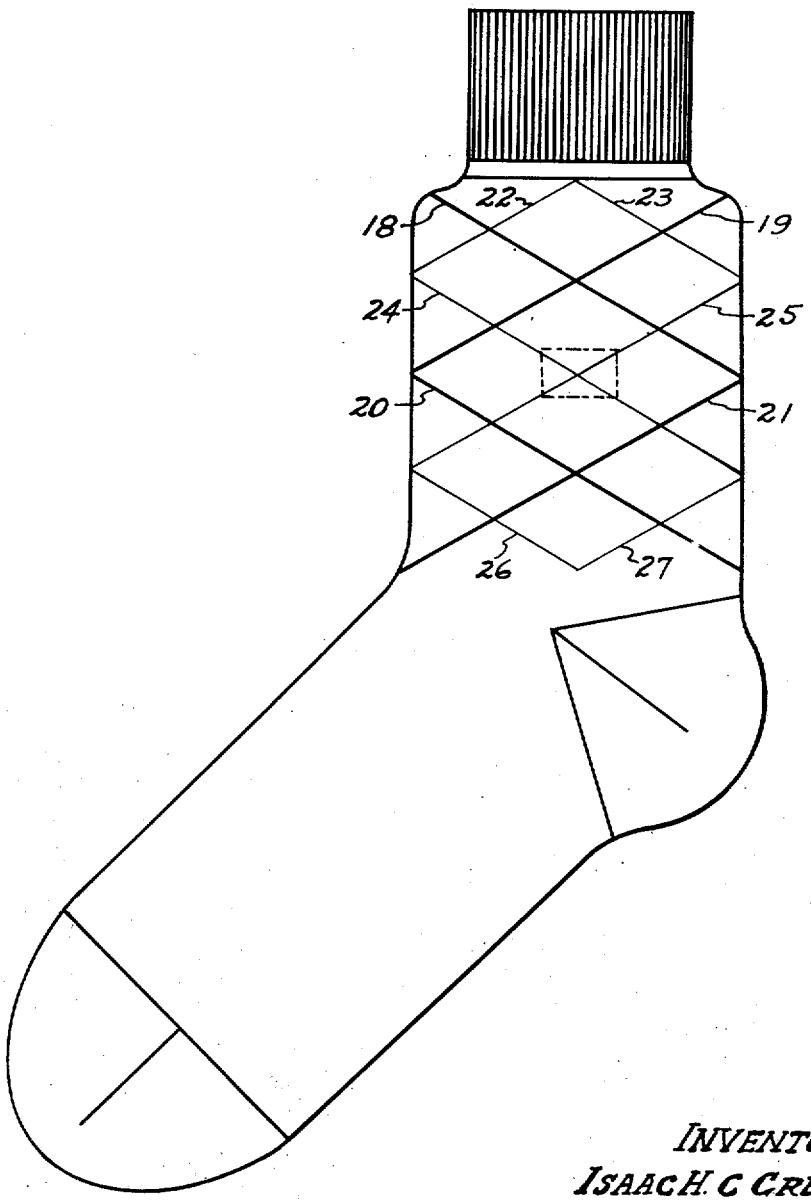

Matter enclosed in heavy brackets [ ] appears in the original patent but forms no part of this reissue specification; matter printed in italics indicates the additions made by reissue.

Figure 2:
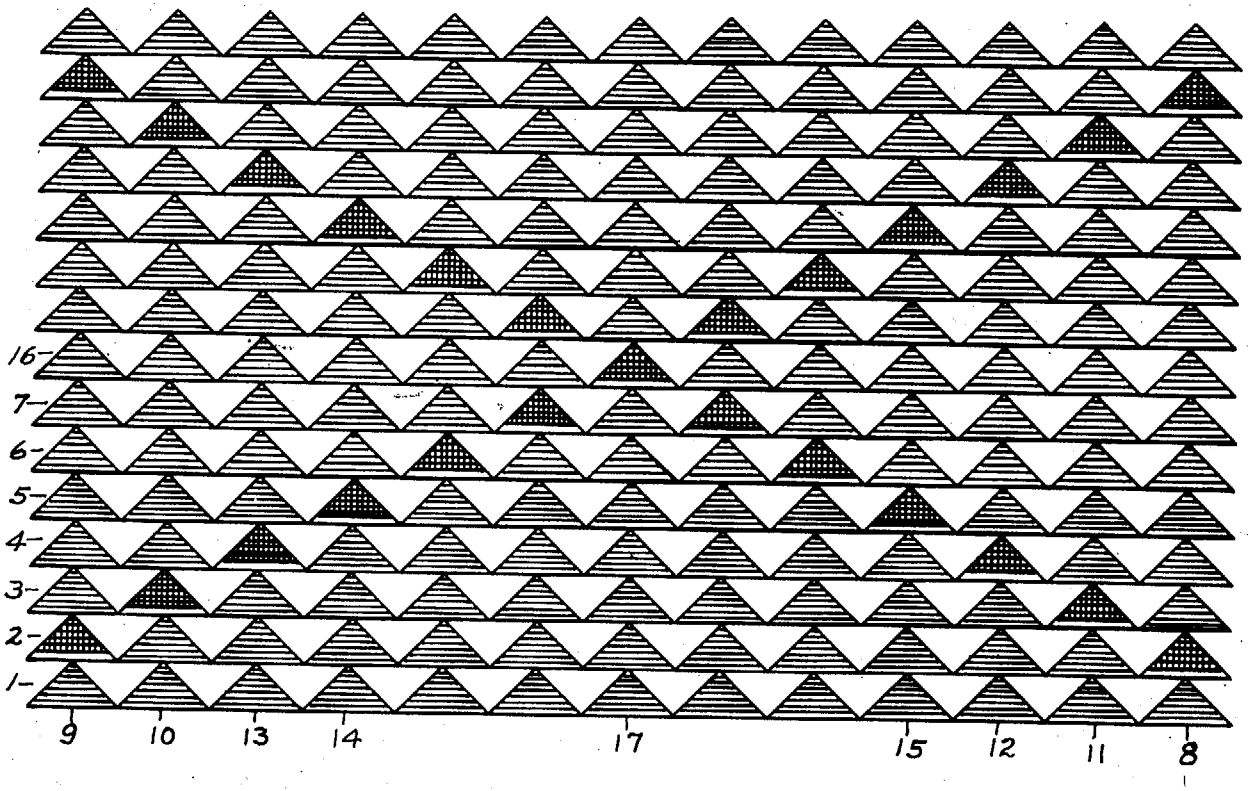
Figure 3:
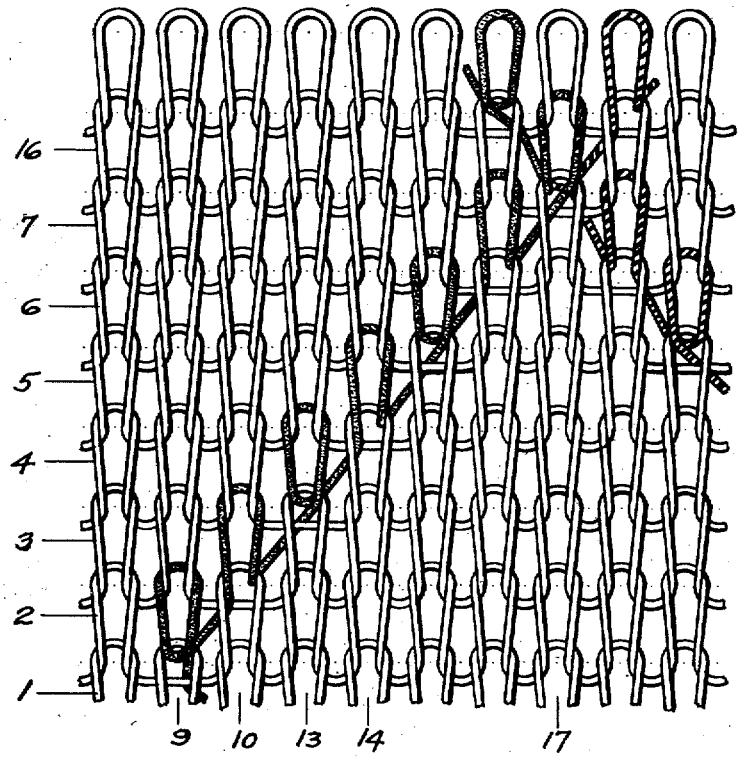

This invention relates to a method of knitting plain hosiery fabric which is ornamented by narrow lines of contrasting color composed of loops which are knitted into the fabric and not superposed thereon. In the drawing:

Figure 1 illustrates the conventional solid color patterned stocking of the so-called Argyle type in which the conventional diamonds have been bisected in both diagonal directions by an overplaid consisting of narrow knitted lines of contrasting color; and Figure 2 is a diagrammatic illustration greatly enlarged of the loop structure in the small section of one diamond represented by the broken line rectangle in Figure 1, and Figure 3 is a corresponding diagrammatic illustration of a different sort.

The manner in which the section referred to of such a stocking is knit is as follows. Referring to Fig. 2, it will be assumed that course 2 is knit from right to left of a body yarn with the exception of wales 8 and 9 across which it is floated. Thereafter, other yarns of contrasting color are knitted into wales 8 and 9 respectively. All of these body yarn and other yarn loops are knitted through the corresponding loops of a previous course, such as 1.

Course 3 is assumed to be knit from left to right. This is done by first knitting the other yarns of contrasting color in wales 10 and 11 respectively and then completing the course by knitting the body yarn in all other wales and floating it across wales 10 and 11.

Course 4 is knit from right to left in the same manner as course 2, the body yarn being knit into all wales with the exception of 12 and 13 across which it is floated and the other yarns of contrasting color being then knitted into wales 12 and 13 respectively to complete the course.

Course 5 is knitted in a similar manner to course 3, the knitting being from left to right and the other yarns of contrasting color being knitted into wales 14 and 15 respectively before the body yarn is knitted into all other wales. Here, also, the body yarn is floated across the wales in which the other yarn is knitted.

The manner and direction of knitting course 6 corresponds to that of courses 2 and 4 and the manner of knitting course 7 corresponds to that of courses 3 and 5 with the exception that the wales of the other yarns of contrasting color are offset in each course as before.

Course 16 is knit in the same manner as the other even numbered courses described below but, in this instance, the yarns of contrasting color cross each other in wale 17. Consequently, they will both be knit into this wale. If the crossing yarns are of the same color, no problem arises but, if they are of different colors, one or the other will appear upon the surface of the fabric and impair the symmetry of the pattern. Therefore, if desired, course 16 may be knit throughout of the body yarn and this, of course, is true when the crossing yarns are of the same color. Thereafter, the knitting may continue, the two course cycles described below being repeated as long as desired.

In Fig. 1, the solid diamonds and half diamonds are contained within the heavy lines 18, 19, 20 and 21. Each of these may be of any desired color. Each is connected to contiguous diamonds by true sutures. The overplaid formed by yarns of contrasting color is represented by the narrow lines, such as 22, 23, 24, 25, 26 and 27. Such a stocking may be knitted upon a machine of the type disclosed and claimed in Patent No. 2,217,022. As described in that patent and as well known, this machine knits the pattern area in the reciprocatory manner and knits two opposite vertical rows of diamonds and half diamonds at the main cam block and the other two rows of diamonds at the auxiliary cam block. At each stroke of the machine a complete course is knitted including that part of every diamond which appears in that course, the various sections of the various diamonds being connected together by true sutures.

The overplaid may be included by knitting in the manner which has been described for a small section of fabric so as to include the entire patterned area as shown in Fig. 1, each course, including the overplaid loops, being knitted complete at one stroke of the machine.

To accomplish this, after the knitting of a course of a diamond is completed at the main cam block, the overplaid needles for this course are selected, receive the respective overplaid yarns and knit at the auxiliary side. As already explained, there are no body yarn loops in the overplaid wales. When the direction of knitting is reversed, each of the overplaid needles again receives its yarn and knits at the auxiliary cam block. After this, the needles which knit the diamond knit at the main cam block and complete the course as described.

At the same time, the opposite set of diamonds is being knit also at the main cam block and may also be provided with an overplaid in the same way, the only difference being that the two course sequence described is reversed. That is to say, where any course of one diamond is knitted at the main side before the overplaid wales are knit, the knitting of the corresponding opposite diamond is done by knitting the overplaid wales first, followed by the knitting of the diamond proper at the main side. In each case, the overplaid needles will receive yarn and knit at the auxiliary side.

The diamonds of one of the other two sets which, with the sets just described, make up the patterned area of the stocking, are knit course by course at the same time as the other diamonds but the diamonds proper are all knit at the auxiliary side and the overplaid is knit at the main side. In other words, the location of knitting is reversed. Also, the sequence of knitting is reversed in that when a diamond of the set first described is being knit at, say, the main cam block followed by the knitting of the overplaid at the auxiliary cam block, the diamond of the other adjacent set is being knit by first knitting the overplaid at the main cam block and then the diamonds proper at the auxiliary cam block. In the next course, this sequence is reversed, and so on.

The opposite diamonds, which are also knit at the auxiliary cam block, are also provided with an overplaid in the same way, the only difference in knitting being that the two course sequence described is reversed.

Although a body yarn has been referred to, it will be understood, of course, that this yarn may be changed as often as desired to produce different colored diamonds or for any other purpose. It also will be understood that the overplaid yarns which combine to produce the overplaid effect may be of the same color and character or of different character and color.

Although the overplaid described above consists of diagonal lines composed of single loops in each course, broader stripes may be obtained by knitting two or more consecutive loops of the overplaid yarns in each instance and offsetting them both in the manner described above by one or two wales. In such a case, the body yarn would be floated across the two or more wales in which the overplaid appears. This illustrates one variation of which there are many. Also, the overplaid is by no means limited to the pattern disclosed and described but is subject to many variations both in character and in direction.

Reference herein to a course of knitting does not necessarily refer to a complete course as in a circular knit stocking, for example, but to any part of the fabric such as that contained within the broken line rectangle in Fig. 1 and, of course, the invention is not limited to the production of hosiery but is applicable to any knitted fabric for any purpose produced by hand or by any type of machine capable of making it.

I claim:

1. A method of reciprocatory knitting for a circular knitting machine which consists of knitting a pattern of a body yarn on one side of the leg of a stocking and simultaneously knitting an overplaid pattern on the other side and thereafter on the same stroke of the machine, knitting an overplaid pattern into the body yarn pattern first mentioned and knitting a body yarn pattern [around] *on either side of* the overplaid pattern first mentioned and then reversing the direction of knitting and then knitting an overplaid pattern on the side first mentioned simultaneously knitting a body yarn pattern on the other side and then knitting a body yarn pattern [around] *on either side of* said *last mentioned* overplaid pattern and then knitting an overplaid pattern into said *next to* last mentioned body yarn pattern and thereafter repeating this two course sequence as many times as desired.

2. A method of reciprocatory knitting for a circular knitting machine which consists of knitting a pattern of a body yarn in one portion of the leg of a stocking and simultaneously knitting an overplaid pattern in another portion and thereafter on the same stroke of the machine, knitting an overplaid pattern into the body yarn pattern first mentioned and knitting a body yarn pattern [around] *on either side of* the overplaid pattern first mentioned and then reversing the direction of knitting and then knitting an overplaid pattern [on] *in* the [side] *portion* first mentioned simultaneously knitting a body yarn pattern [on] *in* the other [side] *portion* and then knitting a body yarn pattern [around] *on either side of* said *last mentioned* overplaid pattern and then knitting an overplaid pattern into said *next to* last mentioned body yarn pattern and thereafter repeating this two course sequence as many times as desired.

3. A method of reciprocatory knitting for a circular knitting machine which consists of knitting a pattern of a body yarn in one portion of a knitted fabric and simultaneously knitting an overplaid pattern in another portion of said fabric and thereafter on the same stroke of the machine, knitting an overplaid pattern into the body yarn pattern first mentioned and knitting a body yarn pattern [around] *on either side of* the overplaid pattern first mentioned and then reversing the direction of knitting and then knitting an overplaid pattern [on] *in* the [side] *portion* first mentioned simultaneously knitting a body yarn pattern [on] *in* the other [side] *portion* and then knitting a body yarn pattern [around] *on either side of* said *last mentioned* overplaid pattern and then knitting an overplaid pattern into said *next to* last mentioned body yarn pattern and thereafter repeating this two course sequence as many times as desired.

4. A method of reciprocatory knitting for a circular knitting machine, comprising the steps of knitting with a body yarn in one portion of an article being knitted, and while said body yarn is being knitted, knitting with a pattern yarn in another portion of the article, and thereafter on the same stroke of the machine knitting with a pattern yarn in the first said portion, while knitting a body yarn in the said other portion on either side of the pattern yarn first mentioned, then reversing the direction of knitting and then knitting with a pattern yarn in the first said portion while knitting with a body yarn in the said other portion, and thereafter on the same reverse stroke of the machine knitting a body yarn on either side of said last mentioned pattern yarn in the first said portion while knitting a pattern yarn in the said other portion, and thereafter repeating this sequence as many times as desired.

5. A method of reciprocatory knitting for a circular knitting machine, comprising the steps of knitting with a body yarn on one side of the leg of a stocking being knitted, and while said body yarn is being knitted, knitting with a pattern yarn on the other side of the stocking leg, and thereafter on the same stroke of the machine knitting with a pattern yarn in the first said side, while knitting a body yarn in the said other [portion] *side* [around] *on either side of* the pattern yarn first mentioned, then reversing the direction of knitting and then knitting with a pattern yarn on the first said side while knitting with a body yarn on the said other side, and thereafter on the same reverse stroke of the machine knitting a body yarn [around] *on either side of* said last-mentioned pattern yarn on the first said side while knitting a pattern yarn on the said other side, and thereafter repeating this sequence as many times as desired.

6. A method of reciprocatory knitting for a circular knitting machine, comprising the steps of knitting with a body yarn in one portion of an article being knitted, and while said body yarn is being knitted, knitting with a pattern yarn in another portion of the article, and thereafter on the same stroke of the machine knitting with a pattern yarn in the first said portion, while knitting a body yarn in the said other portion on either side of the pattern yarn first mentioned, then reversing the direction of knitting and then knitting with a pattern yarn in the first said portion while knitting with a body yarn in the said other portion, and thereafter on the same reverse stroke of the machine knitting a body yarn on either side of said last-mentioned pattern yarn in the first said portion while knitting a pattern yarn in the said other portion, and thereafter repeating this sequence as many times as desired, the body yarn being floated in each course across the wale or wales in which the said pattern yarn is knitted.

7. A method of reciprocatory knitting for a circular knitting machine, comprising the steps of knitting with a body yarn on one side of the leg of a stocking being knitted, and while said body yarn is being knitted, knitting with a pattern yarn on the other side of the stocking leg, and thereafter on the same stroke of the machine knitting with a pattern yarn in the first said side, while knitting a body yarn in the said other portion around the pattern yarn first mentioned, then reversing the direction of knitting and then knitting with a pattern yarn on the first said side while knitting with a body yarn on the said other side, and thereafter on the same reverse stroke of the machine knitting a body yarn around said last-mentioned pattern yarn on the first said side while knitting a pattern yarn on the said other side, and thereafter repeating this sequence as many times as desired, the body yarn being floated in each course across the wale or wales in which the said pattern yarn is knitted.

References Cited in the file of this patent or the original patent

UNITED STATES PATENTS 2,680,961 Thurston ---------- June 15, 1954

FOREIGN PATENTS 308,421 Great Britain ---------- Mar. 28, 1929